March 23, 1948.  L. H. WASHINGTON  2,438,196
HEADLIGHT AND SUPPORTING MEANS THEREFOR
Filed May 11, 1945
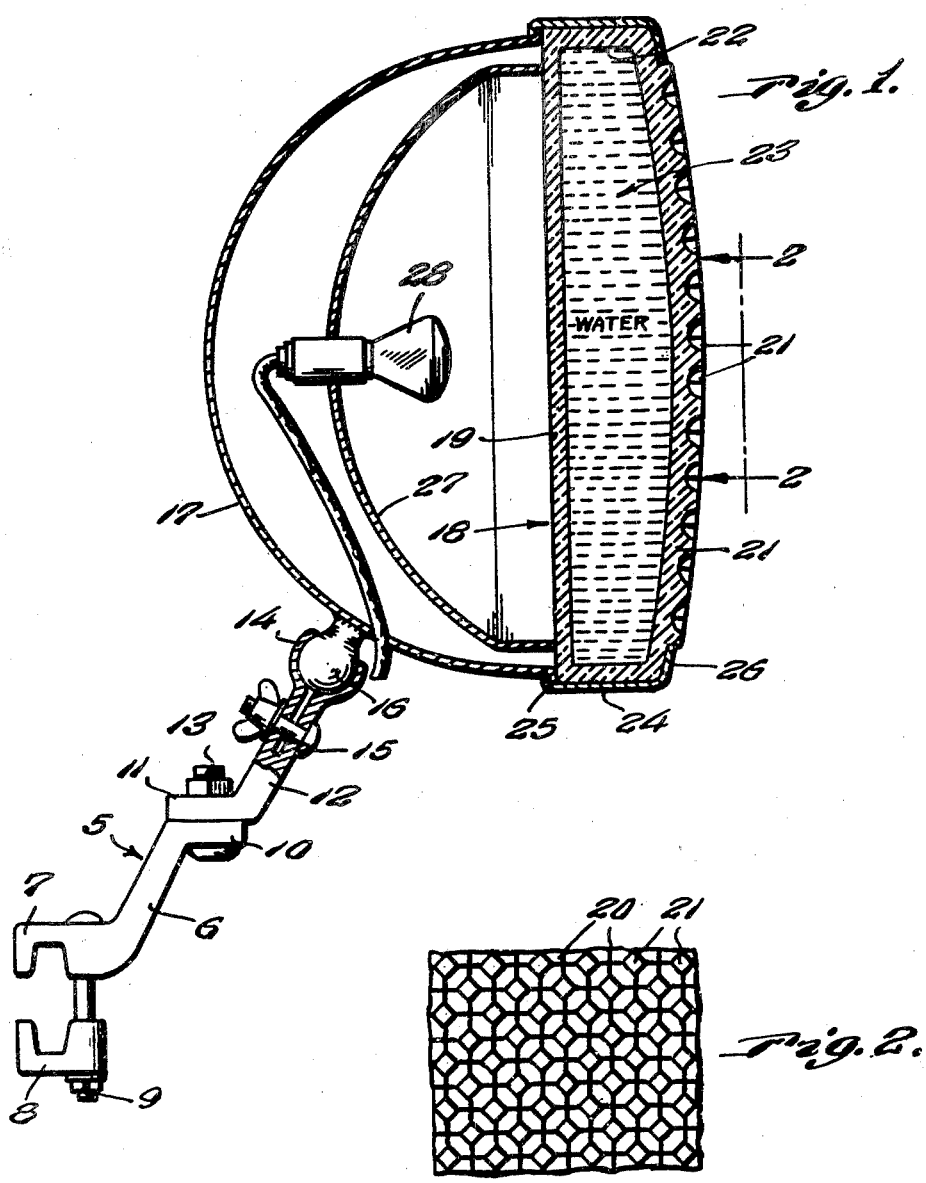
Inventor
Lemuel H. Washington Patented Mar. 23, 1948

2,438,196

UNITED STATES PATENT OFFICE 2,438,196

HEADLIGHT AND SUPPORTING MEANS THEREFOR

Lemuel H. Washington, Portsmouth, Va.

Application May 11, 1945, Serial No. 593,204

2 Claims. (Cl. 240—41.3)

The present invention relates to an improved headlight and supporting means therefor, such as is especially, but not necessarily, adapted for use on present-day automobiles.

More specifically, the invention has to do with a novel lens construction, the latter characterized by a one-piece glass or equivalent unit, said unit being fashioned to provide a liquid container including an inner flat disc lens and an outer concavo-convex lens, these connected by a marginal annular rim. The receptacle thus constructed is charged with a light-diffusing liquid, for instance, water, the latter in conjunction with the two lenses functioning to modify the projected light rays in a manner to diminish and minimize objectionable glare.

Another feature of the invention pertains to a metal or equivalent frame, this encasing the rim of said double lens unit, and said frame constituting a light interceptor and shield, whereby to compel the outgoing or projected light rays to pass through the lenses and intervening liquid filter.

Another phase of the invention has to do with a suitable supporting bracket structure which lends itself adaptable to the type of headlight referred to, the same being aptly and suitably adjustable to poise and dispose the headlight in a suitable and satisfactory position for best results.

Other features and advantages will become more readily apparent from the following description and the accompanying illustrative drawings.

In the drawings, wherein like numerals are employed to designate like parts throughout the views—

Figure 1 is a view essentially in section, but partly in elevation, showing the complete supporting means and headlight, with the parts in readiness for use.

Figure 2 is a fragmentary view of the outer concavo-convex lens illustrating the prismatic projections.

Referring now to the drawing, the supporting means, which is attachable to a suitable part of the automobile (not shown) is denoted, generally speaking, by the numeral 5. It is characterized by a base bracket 6 having a retaining hook 7 and carrying a bolt and nut supporting a complemental clamping hook 8, the bolt and nut being indicated generally at 9. The upper end of the bracket is laterally offset as at 10, this being horizontally disposed and serving to accommodate the lateral horizontal foot 11 on the lower end of the upper bracket 12. The two brackets are bolted together, as at 13, the bolt passing through the abutting lateral foot members 10 and 11. The upper bracket terminates at its upper end in a so-called split part-spherical socket 14, the parts being bound together by a clamping bolt 15. A ball jointing element 16 fits in the socket and is integrally attached to the customarily shaped casing 17 of the headlight assembly.

The anti-glare lens unit is denoted by the numeral 18 and, as before indicated, is preferably a one-piece device constructed of transparent glass or equivalent material. It is characterized by a flat, disc-like inner lens 19 and a companion outwardly spaced concavo-convex outer lens 20. The concave surface of the latter lens is provided with a multiplicity of light-diffusing projections 21 forming a so-called honey-comb, and said projections being preferably prismatic in form. The two lenses are connected by an endless or annular marginal rim 22, thus forming a receptacle for the water filter medium 23. The rim 22 is confined in and surrounded by a metal or equivalent assembling and retaining frame 24, this being of general channel shaped cross-sectional form and having its inner flange 25 interlocked with a flange on the open side of the shell or casing 17, as shown in the drawing. A somewhat wider flange 26, on the outer peripheral edge, engages the adjacent marginal edge portion of the outer lens 20. The part 24 is non-transparent to prevent light rays from passing through the parts of the lens unit covered thereby. The reflector is denoted at 27 and the conventional lamp bulb at 28. The outer marginal edge of the reflector contacts the inner lens 19 at about the region or area indicated.

It is believed that a headlight equipped with a double lens chamber or receptacle with water or an equivalent liquid between the two lenses will function to diminish objectionable headlight glare.

Also, as before indicated, a special supporting bracket, forming the supporting means 5, contributes to a proper support of the headlight from the car or automobile to thus enhance its safety features.

Although it is perhaps of no patentable moment, I desire to set forth here the fact that in certain seasons, and frigid areas it may be necessary, in actual practice, to introduce clear alcohol into the body of water this to function as an anti-freeze agent.

It is thought that persons skilled in the art to which the invention relates will be able to obtain a clear understanding of the invention after considering the description in connection with the drawings. Therefore, a more lengthly description is regarded as unnecessary.

Minor changes in the shape, size and arrangement of details coming within the field of invention claimed may be resorted to in actual practice, if desired.

I claim:

1. An anti-glare headlight construction of the class described comprising an outer shell constituting a casing, a reflector mounted in said casing, a bulb supported on said reflector, a relatively wide annular lens supporting member, said lens supporting member being in the form of a non-transparent frame substantially channel-shaped in cross-sectional form, said frame being mounted on and projecting beyond the outer end of said casing, and a dual lens unit fitted and mounted in said frame, said lens unit being a one-piece device fashioned of glass or equivalent transparent material and embodying a flat, disc-like inner lens, an outwardly spaced concavo-convex outer lens, the latter having its outer surface provided with light-diffusing projections, said lenses being connected together by an annular rim and providing a receptacle for a filtering liquid.

2. A structural assemblage of the class described, a twin bracket support comprising a one-piece Z-shaped bracket provided at its extreme lower end with a laterally offset anchoring hook and at its upper end with a laterally offset, substantially horizontal foot, a second clamping hook opposed to the first-named clamping hook, bolt and nut means assembling and supporting same in place, an upper L-shaped bracket having a lateral foot at its lower end bolted adjustably and detachably to the first-named foot, said upper bracket being provided at its upper end with a split socket, binding means for the split portions of the socket, and a headlight structure having a ball jointing member fitted in said split socket.

LEMUEL H. WASHINGTON.

REFERENCES CITED

The following references are of record in the file of this patent:

UNITED STATES PATENTS

| Number | Name | Date |
|---|---|---|
| 972,480 | Southwick | Oct. 11, 1910 |
| 1,241,886 | Rowe | Oct. 2, 1917 |
| 1,569,973 | Goettert | Jan. 19, 1926 |
| 1,837,886 | Schmidt | Dec. 22, 1931 |
| 2,320,209 | Bahr | May 25, 1943 |

FOREIGN PATENTS

| Number | Country | Date |
|---|---|---|
| 376,982 | Great Britain | July 21, 1932 |